United States Patent

[11] 3,620,701

[72] Inventors Nicholas S. Janetos
 East Providence;
 Alfred Marzocchi, Cumberland; David E. Leary, Cumberland, all of R.I.
[21] Appl. No. 850,348
[22] Filed Aug. 13, 1969
[45] Patented Nov. 16, 1971
[73] Assignee Owens-Corning Fiberglas Corporation
 Continuation-in-part of application Ser. No. 655,944, July 25, 1967, now abandoned. This application Aug. 13, 1969. Ser. No. 850,348
 The portion of the term of the patent subsequent to Jan. 28, 1986, has been disclaimed.

[54] METHOD FOR TREATING AND IMPREGNATING GLASS FIBER BUNDLES FOR REINFORCEMENT OF ELASTOMERIC MATERIALS AND PRODUCT
 18 Claims, 4 Drawing Figs.
[52] U.S. Cl. .................................................. 65/3,
 117/72, 117/126 GR
[51] Int. Cl. ..................................................... C03c 25/02
[50] Field of Search ........................................... 65/3;
 117/72, 76 T, 126 GB, 126 GS

[56] References Cited
 UNITED STATES PATENTS
3,424,608 1/1969 Marzocchi et al. .......... 117/126 X Primary Examiner—William D. Martin
Assistant Examiner—David Cohen
Attorneys—Staelin & Overman and Herman I. Hersh ABSTRACT: The concepts of this invention reside in the coating of individual glass fibers, in connection with the glass fiber-forming operation, with an elastomeric compatible composition having a curable elastomeric material, followed by at least partial cure of the elastomeric material before the bundle formed of a multiplicity of such coated glass fibers are flexed during processing of the glass fibers in strand, yarn, cord, or fabric formation, whereby the elastomeric-based composition is capable, even when present in an amount as low as 1–4 percent by weight solids, of protecting the coated glass fibers from breaking through the coating during flexure and whereby the bundle formed of the coated glass fibers can be processed to the form desired for use as a reinforcement without seizure or otherwise interfering with the processing steps, after which the bundle is impregnated with an elastomeric-based material for the desirable full loading of the glass fiber bundle to enhance the integration of the reinforcing bundle of glass fibers with the elastomeric matrix in the manufacture of glass fiber-reinforced elastomeric products.

INVENTORS
Nicholas S. Janetos
Alfred Marzocchi
David E. Leary
by Staelin and Overman
Att'ys

METHOD FOR TREATING AND IMPREGNATING GLASS FIBER BUNDLES FOR REINFORCEMENT OF ELASTOMERIC MATERIALS AND PRODUCT

This is a continuation-in-part of our copending application Ser. No. 655,944, filed July 25, 1967, now abandoned, and entitled "Method for Treating and Impregnating Glass Fiber Bundles for Reinforcement of Elastomeric Materials"

This invention relates to the treatment of glass fibers for use of the glass fibers in combination with elastomeric materials in the manufacture of glass fiber-reinforced elastomeric products, such as rubber belts, rubber tires and the like, formed of natural or synthetic rubbers where high strength, toughness and dimensional stability can be greatly benefitted by the presence of the glass fibers.

Considerable research and development have been conducted in utilization of glass fibers as a reinforcement for elastomeric materials in the manufacture of glass fiber-reinforced products.

From the careful analysis of such research and development, conducted over the past several years, it has been concluded that best use of glass fibers as a reinforcement for elastomeric materials is achieved when the glass fibers are embodied in the elastomeric materials in the form of bundles of a multiplicity of glass fibers wherein the bundle is capable of reacting as a unit with sufficient adjustment between the fibers to enable substantially all of the fibers in the bundle to contribute their fair share in resisting the forces to which the reinforced product is being subjected.

Having established the basic requirements for a suitable glass fiber reinforcement for elastomeric products, the problem arises with respect to the method and means for producing glass fiber-reinforcing elements which meet these basic requirements for their utilization as a glass fiber reinforcement in glass fiber-reinforced elastomeric products.

It is an object of this invention to produce and to provide a method for producing reinforcing bundles of glass fibers in which the bundles of glass fibers embody an elastomeric compatible material which provides a protective coating on the individual glass fibers in the bundle and yet prevents interfilament bonding, which enables the fibers and the bundles formed thereof to be flexed in processing to the desired arrangement for reinforcement without permitting the individual glass fibers in the bundle to cut through the protective coating, yet permits the glass fibers to be processed to the desired form for reinforcement, and which embodies a full complement of elastomeric compatible material sufficient to achieve a strong and permanent interbonded relationship between the reinforcing bundle of glass fibers and the continuous phase elastomer in the glass fiber-reinforced elastomeric product.

These and other objects and advantages of the invention will hereinafter appear and for purposes of illustration, but not of limitation, an embodiment of the invention is shown in the accompanying drawing in which FIG. 1 is a schematic elevational view of one phase of the process for coating the glass fibers in forming;

Figure 1:
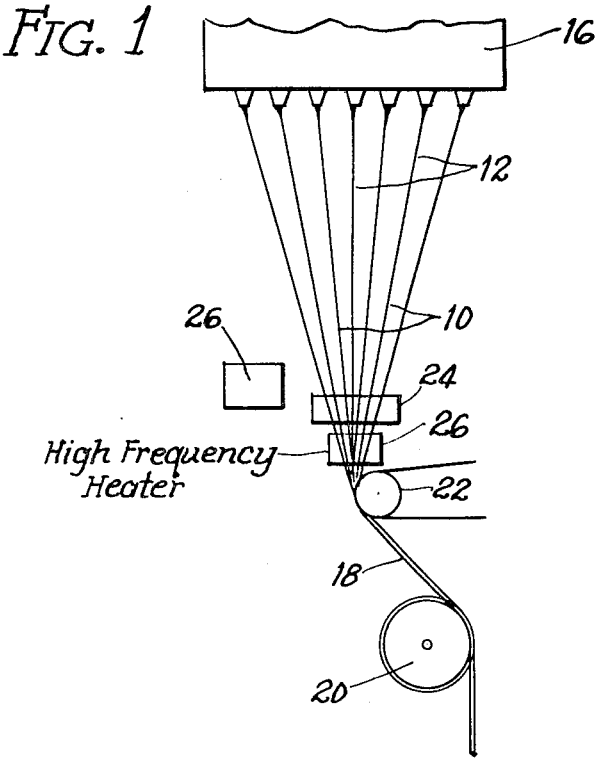
Figure 2:
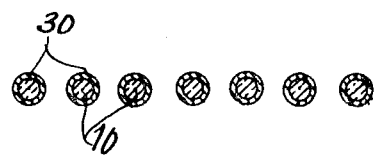
FIG. 2 is a partial sectional view of the bundle of glass fibers produced by the phase of the operation shown in FIG. 1.
Figure 3:
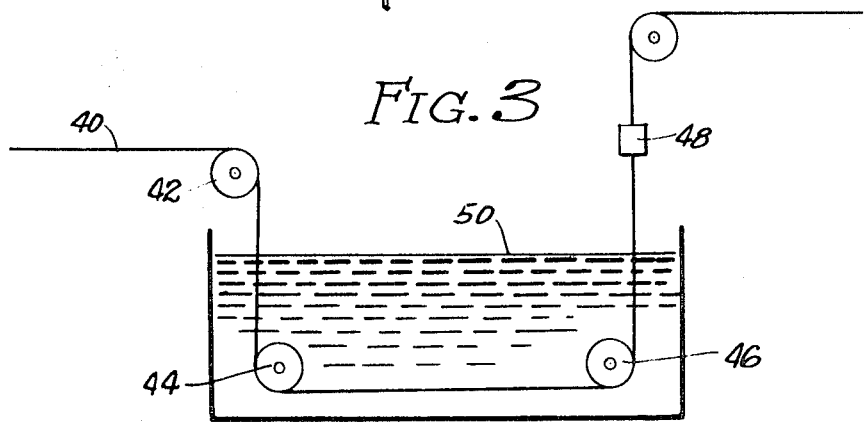
FIG. 3 is a schematic view of a further phase of the operation for treatment of the glass fibers in accordance with the practice of this invention.
Figure 4:
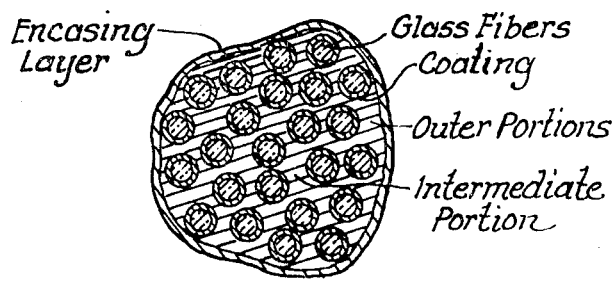
FIG. 4 is a sectional view of a portion of a glass fiber bundle which results from the process illustrated in FIGS. 1-3.

In our copending application filed concurrently herewith and entitled "Method for Treating and Impregnating Glass Fiber Bundles for Reinforcement of Elastomeric Materials," description is made of one technique for preparation of a glass fiber reinforcement for elastomeric products wherein the individual glass fibers are coated, during the glass fiber-forming operation, with an elastomeric compatible composition in an amount sufficient to provide a protective coating on the glass fiber surfaces to prevent the fibers from breaking through the coating in response to flexure during processing of the glass fibers in bundle formation, i.e., the formation of the fibers into strands, yarn, cords or fabrics, and then impregnating the bundle of previously coated fibers with additional elastomeric compatible composition to introduce a full complement of elastomeric compatible materials, defined as an amount sufficient to protect the fibers and to interbond the bundle of coated and impregnated glass fibers with a continuous phase of elastomeric materials, while permitting adjustment between the glass fibers making up the bundle to enable the glass fibers to contribute their fair share of reinforcement. Because of the tendency towards seizure, the amount of elastomeric compatible material applied as a coating onto the glass fiber surfaces in forming was limited to from 4-10 percent by weight, calculated on the dry solids basis and preferably within the range of 7-8 percent by weight, while the amount added by impregnation of the bundles formed by the coated fibers was sufficient to bring the total loading of the glass fiber bundle to an amount greater than 10 percent by weight but less than 24 percent by weight, and preferably in an amount within the range of 14-20 percent by weight of elastomeric material, with best results being secured with an amount within the range of 16-18 percent by weight, calculated on a dry solids basis.

It has been found, in accordance with the practice of this invention, that less than 5 percent by weight to as little as 1 percent by weight (solids) of an elastomeric-based composition can be applied as a coating onto the individual glass fiber filaments during the fiber-forming operation, if the elastomeric material is subjected to at least partial cure, after and preferably before the multiplicity of the coated fibers are gathered together to form the strand, but before the strand is processed as by plying, twisting, intertwisting and/or waving into strands, yarns, cords or fabrics. It is believed that when the coating of elastomeric material is advanced to an intermediate or complete stage of cure, the coating is rendered sufficiently tough to prevent breakthrough of the glass fibers during flexure of the glass fiber bundle, whereby the bundles of glass fibers can be processed as described without deterioration of the fibers making up the reinforced bundle.

Application of the elastomeric-based material in an amount less than 0.5 percent by weight, on the dry solids basis, is insufficient to provide the desired protection to the glass fibers. In the preferred practice of this invention, it is desirable to coat the glass fibers in forming with the curable elastomeric-based composition in coating weights within the range of 2-4 percent by weight of the coated fibers, when calculated on the dry solids basis. When the glass fiber filaments are coated in forming with an amount greater than 5 percent by weight of curable elastomeric-based material, the bundle of glass fibers subsequently formed is incapable of being penetrated sufficiently to enable the desired subsequent impregnation with elastomeric-based materials, to achieve the additional loading believed to be desirable for the development of a good interbonded relationship between the glass fiber reinforcement and the continuous phase elastomer and to integrate the glass fiber reinforcement into the elastomeric product. When, on the other hand, the glass fibers are coated in forming with a curable elastomeric material in an amount less than 5 percent by weight, the bundle formed with the at least partially cured elastomeric-based material coating the glass fibers is characterized by sufficient porosity to enable penetration of the glass fiber bundle by elastomeric-based impregnating compositions for the desired additional loading of the glass fiber reinforcement. Introduction of additional elastomeric-based material, by impregnation of the bundle of previously coated glass fibers, can be made by one or more impregnations to introduce an amount of elastomeric-based material to bring the total of elastomeric material in the glass fiber bundle to an amount grater than 8 percent by weight of dry solids and preferably to an amount greater than 12 percent by weight. It is undesirable to exceed an amount greater than 24 percent by weight elastomeric-based material by such subsequent impregnation of the glass fiber bundle, since any such greater amounts of elastomeric material merely form into encapsulating rubber layers which are free of glass fibers and thus incapable of contributing to the reinforcement.

The curable elastomeric material can be applied, in forming, to coat the individual glass fibers with an amount of elastomeric-based material greater than 5 percent by weight, but then it is desirable to apply the full increment of elastomeric material in the forming step, since additional elastomeric material introduced by impregnation merely operates to coat the bundle of glass fibers as distinguished from the desired impregnation thereof. As a result, when the full increment of elastomeric material is applied by coating the individual glass fibers during the forming operation, it is desirable to apply the curable elastomeric material in coating weights which exceed 8 percent by weight of coated glass fibers and preferably in coating weights of 10–16 percent by weight of the coated glass fibers. While such coated glass fibers are difficult to process into glass fiber bundles without seizure, in the absence of previous drying or cure, the glass fibers with such amounts of rubber-based materials can be processed to the form desired for reinforcement without seizure after the elastomeric material has been heated to cure or at least partial cure.

When the bundle of glass fibers contains the full complement of elastomeric-based material in the cured or partially cured state, it becomes difficult to integrate the reinforced bundles of glass fibers into the continuous phase of elastomeric material in forming the glass fiber-reinforced elastomeric product. Nevertheless, a sufficiently strong interbonded relationship can be established, preferably by the use of interfacial bonding agents, such as organo-silicon compounds containing amino, epoxy or carboxylic groups. It is preferred, however, to make use of the system initially described wherein the glass fibers are coated in forming with an amount of curable elastomeric material within the range of 0.5–5 percent by weight, whereby a porous bundle of glass fibers is formed which is capable of being penetrated for subsequent impregnation with elastomeric-based material to provide the additional increment for full integration of the glass fiber reinforcement into the elastomeric product.

Under such circumstances, the glass fiber reinforcement comprises a bundle of glass fibers in which the individual glass fibers in the bundle are coated with elastomeric-based material throughout the cross section of the glass fiber bundle, with the concentration of the elastomeric material in the glass fiber bundle increasing from the center of the bundle outwardly and preferably with a layer of elastomeric material encompassing the impregnated bundle of coated glass fibers. A reinforced bundle of the type described is capable of providing protection for the individual glass fibers to prevent their breaking through the coating during flexure of the glass fiber bundle while also permitting interbonding between the reinforcing bundle of the glass fibers and the elastomeric matrix forming the continuous phase during vulcanizing or cure to form the glass fiber-reinforced product.

As used herein, the term elastomeric compatible material includes resinous-based and elastomer-based materials and the term "elastomeric-based material" is meant to refer to a glass fiber coating composition or a glass fiber bundle impregnating composition in which an elastomeric material constitutes the sole solids component of the coating or impregnating composition or preferably embodies a component of the coating or impregnating composition in combination with other materials such as a resin, as represented by phenol formaldehyde resin, melamine formaldehyde resin, epoxy resin, polyester resin, resorcinol formaldehyde resin and the like, or a filler such as zinc oxide, carbon black and the like, and/or a lubricant such as graphite, wax or the like, or the combination of elastomers alone or in combination with the resinous material as represented by the compositions described in the copending applications, Ser. No. 398,305, filed Sept. 22, 1964; Ser. No. 400,517, filed Sept. 30, 1964, now abandoned; Ser. No. 397,956, filed Sept. 21, 1964 now U.S. Pat. No. 3,402,064 and Ser. No. 494,654, filed Oct. 11, 1965, now abandoned.

As used herein, the term "continuous phase elastomer" is meant to refer to the rubber or elastomeric phase forming the continuous phase of the elastomeric product. The elastomeric phase of the coating composition and/or the impregnating composition may be the same or different than the elastomeric material forming the continuous phase but it is desirable that such elastomeric material be compatible one with the other, at least in their uncured state, so as to avoid phase separation.

The composition applied to the glass fiber surfaces in forming should contain a rubber component which is curable and which becomes strongly bonded to the glass fiber surfaces upon cure or partial cure, with or without an anchoring agent present, such as an organo-silicon compound containing amino, epoxy or carboxy groups, as represented by a gamma-aminopropyltriethoxysilane. As the rubber elastomeric component in the coating, use can be made of natural rubber formulated into a size composition with usual accelerators, catalysts and promoters for sulfur cure, or use can be made of butadiene rubbers, and rubbers formed of butadiene copolymerized with a monoolefin such as styrene, nitriles, acrylic acids and esters thereof and terpolymers of butadiene with styrene, acrylonitrile and vinyl pyridine. The aforementioned rubbers are curable in the presence of heat and/or catalyst and such curable rubbers also include carboxylated modified derivatives of such butadiene rubbers as represented by carboxylated butadiene-styrene copolymer, carboxylated butadiene acrylonitrile, carboxylated butadiene-styrene-vinyl pyridine copolymer and carboxylated butadiene-styrene-acrylonitrile terpolymer. Use may also be made of other sulfur curing or free radical curing rubbers, such as the EPDM rubbers. Such elastomeric components are preferably formulated in the size composition with adhesion-promoting resinous systems, such as resorcinol formaldehyde resins.

As the elastomeric material of the continuous phase and of the impregnating compositions, use can be made of natural rubber or a synthetic rubber, such as formed by polymerization of monomeric materials such as chloroprene, various of the conjugated butadienes, such as 1,3-butadiene, methyl-2-butadiene, 1,3-piperylene, and 2,3-dimethyl butadiene; and mixtures of such conjugated butadienes with other copolymerizable monomers, such as up to 50 percent or more by weight of a monomer which contains a monoolefinic group, such as aryl olefins, as represented by styrene and vinyl naphthalene; and alpha-methylene carboxylic acids and their corresponding esters, nitrils and amides, such as acrylic acid, methyl acrylates, methylmethacrylate, acrylonitrile, methylacrylamine and the like; isobutylene, methyl-vinyl-ester and methyl-vinyl-ketone. The elastomeric component may also comprise an EPDM-type rubber such as formed by the interpolymerization of ethylene, monoolefin containing from three to 18 carbon atoms, such as propylene, butylene, etc., and a polyolefin, such as cyclopentadiene, 1,2-hexadiene, and preferably a 5-alkenyl-2-norbornene or a 5-alkylidene-2-norbornene, such as 5-ethylidene-2-norbornene, 5-propylidene-2-norbornene, 5-butenyl-2-norbornene, and the like.

As used herein, the term "coating the glass fiber filaments during forming" is meant to refer to a coating of the individual glass fibers as they are drawn by rapid attenuation of molten streams of glass issuing from openings through the wall of a bushing or feeder communicating with a glass-melting chamber. The attenuated glass fibers are gathered together to form a strand which is suitably collected, as by being wound upon a rapidly rotating drum or spindle. Some hundreds of such glass fiber filaments are gathered together to form the strand which can be later plied, twisted or intertwisted with outer strands to form yarns or cords, which can be processed by weaving or the like into desired reinforcing fabrics. Application of the elastomeric-based coating composition is made in the conventional manner by a pad or roller continuously wet with the composition and over which the filaments are drawn as they are gathered together to form the bundle. This describes the forming operation for continuous fibers. With discontinuous fibers, formed by engaging the molten streams of glass with downwardly directed blasts of high-pressure air, steam or gas, treating composition may be sprayed onto the discontinuous fibers as they rain down onto a collecting surface, either gravitationally or with the aid of the blast. Instead, the treating composition can be applied after the discontinuous fibers have been collected on the surface but before removal for drafting to form the yarn.

Specific description will now be made of the practice of this invention with the following glass fiber treating and impregnating compositions set forth by way of examples:

EXAMPLE 1

5% by weight carboxylato butadiene-styrene (71 butadiene, 29 styrene)
0.2% by weight gamma-aminopropyltriethoxysilane
0.2% by weight surface active agent
94.6% by weight water

EXAMPLE 2

4% by weight butadiene-styrene copolymer (70–30)
0.5% by weight surface active agent
95.5% by weight water

EXAMPLE 3

3% by weight butadiene (70)-styrene (15)-vinyl pyridine (15)terpolymer
0.5% by weight surface active agent
96.5% by weight water

EXAMPLE 4

100 parts by weight natural rubber latex (40% rubber)
1.0 parts by weight stearic acid
1.5 parts by weight mercapto benzothiazole
3.0 parts by weight tetramethyl thiuram monosulfide
1.0 part by weight sulfur

EXAMPLE 5

5% by weight carboxylato butadiene-acrylonitrile copolymer (60:40)
0.4% surface active agent
94.6% by weight water

EXAMPLE 6

6% by weight butadiene-styrene-acrylonitrile terpolymer (60:20:20)
1% by weight emulsifying agent
93% by weight water

EXAMPLE 7

5% by weight butadiene (70)-styrene (30) copolymer
3% by weight resorcinol formaldehyde—latex resin (Lotol 5440)
0.5% weight surface active agent
91.5% by weight water

EXAMPLE 8

4.0% by weight butadiene-styrene-vinyl pyridine terpolymer
3.0% by weight polyamide resin
0.5% by weight gamma-aminopropyltriethoxysilane
1.0% by weight emulsifying agent
91.5% weight water Procedure:

Continuous glass fiber filaments 10 are formed by the rapid attenuation of molten streams of glass 12 issuing from openings through the bottom side of a wall 16 in connection with a glass-melting furnace. The molten streams are rapidly attenuated into fibers and gathered together into a bundle or strand 18 after they are brought together over a guide 22, with the strand being wound about a rapidly rotating drum 20.

Application of the coating composition of example 1–8 is made to the individual glass fiber filaments 10 before they are gathered together as by means of a roller 24 so that the individual fibers or filaments will each be individually coated with a layer of the coating composition. The peripheral surface of the roller is continuously wet by an applicator blade or brush with material fed from a reservoir 26 and the individual filaments ride over the periphery of the roller subsequent to their attenuation, but before they are gathered together to form the bundle. After being coated by the roller, the guide pad 22 can be used to gather the fibers together to form the bundle in which the individual fibers 10 are wet with the coating composition. More than one applicator roller may be employed for wetting the individual glass fibers, depending somewhat upon the solids content of the coating composition and the amount that is picked up by the fibers. However performed, application of coating composition to the individual glass fibers should provide a coating having a dry coating weight of less than 5 percent and preferably within the range of 1–3 percent by weight based upon the coated glass fibers.

Before the fibers are gathered together to form the strand, the coated fibers are flash heated, as by means of high-frequency heating means 26 to heat the coating to a temperature within the range of 350°–600° F., and preferably to a temperature within the range of 400°–450° F., for a time sufficient to flash off the water and advance the elastomeric component to a partially cured stage. A fraction of a second up to a few seconds is sufficient to effect the desired cure. In order to provide for the length of heating, the high-frequency means may comprise a tubular high-frequency cell through which the fibers are advanced or a series of plates forming poles for inducing the high-frequency current for heat generation into the coating during passage from the applicator roll to the collecting guide.

The formed strands of glass fibers 18 can be combined with other strands, or plied, twisted or otherwise interlaced with other strands to form threads, yarns or cords which can be further processed by weaving to form woven or nonwoven fabrics or cut or chopped to short lengths such as 1 to 3 inches, all of which are included herein within the term "glass fiber bundle" to define the product which is subjected to the subsequent impregnation operation to incorporate the additional amounts of rubber-based material adapted at least partially to penetrate into the treated glass fiber bundle and to build up the higher concentration of rubber in the outer portions of the glass fiber bundle, by comparison with the interior of the coated bundle of glass fibers.

After processing the coated and partially cured glass fibers to the desired bundle form for combination with the continuous phase elastomer in the manufacture of glass fiber-reinforced elastomeric products, the bundles of glass fibers are immersed or otherwise wet with a rubber-based impregnating composition as hereinafter described. The strand of glass fibers can be advanced by a pulling wheel which drives the strand to a takeup device provided with a magnetic clutch or into a box or other suitable collecting device.

Impregnating Compositions as described in application, Ser. No. 398,305;

EXAMPLE 9

60% by weight natural rubber latex—resorcinol formaldehyde resin dispersed in aqueous medium to 38% solids (Lotol 5440—U.S. Rubber Company)
40% by weight water

EXAMPLE 10

15% weight natural rubber latex—resorcinol formaldehyde resin dispersed in aqueous medium to 38% solids
82% by weight water 3% by weight gamma-aminopropyltriethoxysilane The dispersion and water mixture are made alkaline with quaternary ammonium hydroxide before addition of the silane.

Impregnating Compositions as described in application, Ser. No. 400,517:

EXAMPLE 11

2.0 parts by weight resorcinol formaldehyde resin
1.4 parts by weight formaldehyde
5.0 parts by weight concentrated ammonium hydroxide
25.0 parts by weight vinyl pyridine-butadiene-styrene terpolymer in the ration of 15:70:15—
41% solids (Gen-Tac FS—General Tire and Rubber Co.)
50.0 parts by weight neoprene rubber latex (50% solids)
7.4 parts by weight butadiene-latex (60% solids)
0.2 part by weight sodium hydroxide
58.0 parts by weight water

EXAMPLE 12

2.0 parts by weight resorcinol formaldehyde resin
1.0 part by weight formaldehyde (37% solution)
2.7 parts by weight concentrated ammonium hydroxide
25.0 parts by weight vinyl pyridine-butadiene-styrene terpolymer latex (42% solid)
41.0 parts by weight neoprene rubber latex (50% solids)
5.0 parts by weight butadiene latex (60% solids)
0.05 parts by weight sodium hydroxide
1.0 part by weight gamma-aminopropyltriethoxysilane
1,100 parts by weight water Impregnating Compositions as described in application, Ser. No. 494,654;

EXAMPLE 13

220 parts by weight water
1 part by weight sodium hydroxide
22 parts by weight resorcinol formaldehyde resin (70% solids)
15 parts by weight Formalin
30 parts by weight ammonium hydroxide
250 parts by weight vinyl pyridine-butadiene-styrene terpolymer latex (15:70:15) (41% solids)
415 parts by weight neoprene rubber latex (50% solids)
51 parts by weight butadiene rubber latex (60% solids)
115 parts by weight carbon black For a schematic illustration, but not by way of limitation, a cord 40 of coated glass fibers in bundle form is advanced continuously over roller 42 for passage downwardly under rollers 44 and 46 and upwardly through a die 48 for complete immersion in a bath 50 of the impregnating composition, as described in examples 9–13. During passage through the bath, the bundle of coated glass fibers will be impregnated with the composition to increase the amount of rubber solids embodied within the glass fiber bundle.

Although the rubber of the coating initially applied to the glass fibers of the bundle is at least partially cured, the amount of rubber applied as a coating is insufficient completely to fill the interstices between the fibers of the bundle or to block penetration of the bundle by the subsequently applied impregnating composition. Thus the impregnating composition will penetrate towards the interior of the bundle but most of the composition will be retained in the outer portions of the bundle whereby the concentration of impregnating solids will be greater in the outer portions of the bundle than in the interior.

The bundle may be passed through the bath one or more times, preferably with intermediate drying, until the total amount of rubber-based treating composition, calculated on the solids basis, adds up to more than 10 percent and preferably within the range of 12–18 percent by weight of the treated glass fiber system.

As the impregnated bundle of glass fibers works through the die 48, the impregnating composition will be forced into the interior of the bundle while excess will be wiped from the outside thereof. Other auxiliary means may be employed to enhance impregnation, such as flexure of the bundle during impregnation to open the bundle, or by the use of alternating pressure impulses and the like for working the composition into the bundle.

The impregnated bundle of glass fibers is dried, preferably by exposure to elevated temperature, such as temperature within the range of 250°–500° F. for a short period of time to remove the volatiles and preferably for a period of time partially to advance the elastomeric material of the impregnating composition to a partially cured stage. Exposure for a time and a temperature to effect full cure or vulcanization of the elastomeric material should be avoided, otherwise proper integration of the treated glass fiber bundle with the continuous phase elastomer will be difficult to achieve during normal pressure molding or vulcanization steps used in the manufacture of the reinforced elastomeric product.

The results of the impregnation is a glass fiber bundle having elastomeric-based material distributed throughout the cross section of the glass fiber bundle, with the individual glass fibers coated with the elastomeric-based material advanced to partially cured stage, but in which the distribution of elastomeric material throughout the bundle ranges from a central portion in which the elastomeric material is present primarily in the form of the elastomeric coating applied to the glass fibers, an intermediate portion which comprises the combination of the elastomeric coating material supplemented by the elastomeric impregnating material, and outer portions comprising the coating applied to the individual glass fibers but in which the elastomeric component is dominated by the portion introduced as the impregnating composition, with possibly possibly layer of the latter encasing the impregnated bundle.

In effect, the original treatment of the glass fibers to coat the individual glass fibers in forming produces a relatively porous bundle of glass fibers which permits penetration of the impregnating composition for anchorage, yet provides a tough coating on the glass fiber surfaces which operates to protect the individual glass fibers from destruction by mutual abrasion during flexing of the glass fiber bundle in strand, yarn, cord, or fabric formation. The initial treatment to coat the individual glass fibers with the partially cured elastomeric material also provides insurance for the presence of rubber-based material throughout the cross section of the glass fiber bundle while permitting rubber-based impregnating composition to be received within the bundle to effect the desired interconnection between the glass fibers making up the bundle and the continuous phase elastomer, thereby to maximize the contribution of the glass fibers as a reinforcement of elastomeric products.

With this construction, maximum utilization can be made of the glass fiber system as a reinforcement for the continuous phase elastomer and for maximizing the contribution of the high-strength properties of the glass fibers, without the need to rely upon the use of an anchoring agent to effect the desired interbonded relationship between the glass fibers and the elastomeric material. The presence of rubber-based coating and impregnating compositions about the glass fiber filaments and through the cross section of the glass fiber bundle operates to integrate the glass fiber system into the continuous phase elastomer while still permitting relative movement between the individual fibers making up the bundle for realignment of the fibers in direction of force.

It will be apparent from the foregoing that we have provided a new and improved concept in the pretreatment of glass fibers and bundles formed thereof whereby the fibers can be processed to the desired condition for use as a reinforcement while incorporating the desired complement of elastomeric material for physical engagement between the entire bundle of glass fibers and the continuous phase elastomeric material while permitting readjustment of the individual glass fibers.

It will be understood that changes may be made in the details of formulation and application without departing from the spirit of the invention, especially as defined in the following claims.

We claim:

1. In the preparation of a reinforcement for glass fiber-elastomeric products in which the elastomeric material constitutes a continuous phase with the glass fibers arranged therein in bundles formed of a multiplicity of glass fibers, the steps of preparation of the glass fibers in the bundle form with an elastomeric based material loading of more than 10 percent and less than 24 percent by weight on the dry solids basis, comprising the steps of coating the individual glass fibers prior to bundle formation with a composition containing a curable or a vulcanizable elastomeric component in a coating weight within the range of 0.5–5 percent by weight of coated fibers, advancing the elastomeric component to at least a partially cured or vulcanized state, forming the multiplicity of coated glass fibers into glass fiber bundles, and then impregnating the processed bundle of glass fibers, prior to their combination with the continuous phase elastomer, with a rubber-based impregnating composition to load the glass fiber bundles with more than 10 percent by weight dry solids of elastomeric based material.

2. The process as claimed in claim 1 in which the elastomeric material in the coating is advanced by heating the coated glass fibers.

3. The process as claimed in claim 2 in which the coated glass fibers are heated to a temperature within the range of 350°–600° F.

4. The process as claimed in claim 1 in which the elastomeric-based coating composition and the elastomeric-based impregnating composition are substantially the same.

5. The process as claimed in claim 1 in which the amount of coating applied to the individual glass fibers is within the range of 2–4 percent by weight on the dry solids basis.

6. The process as claimed in claim 1 in which the elastomeric coating is applied to the glass fibers in forming to coat the individual glass fibers.

7. The process as claimed in claim 1 in which the total elastomeric-based material in the impregnated bundles of glass fibers is within the range of 10–18 percent by weight of the impregnated glass fiber system.

8. The process as claimed in claim 1 which includes the steps of combining the impregnated bundle of glass fibers with the continuous phase elastomer and molding the glass fiber-elastomeric product therefrom.

9. The process as claimed in claim 1 in which the glass fiber bundle has rubber-based material distributed substantially throughout the bundle of glass fibers with a higher concentration of elastomeric-based material at the outer portions of the glass fiber bundle by comparison with the interior and with the elastomeric material coating each of the fibers in an advanced state of cure or vulcanization.

10. The process as claimed in claim 9 in which the bundle is substantially enclosed within a layer of the elastomeric-based material.

11. In the preparation of an element of glass fibers for use in the reinforcement of elastomeric materials forming the continuous phase in the manufacture of glass fiber - elastomeric products, the method for improving the integration of the glass fiber component with the elastomeric material comprising the steps of providing a glass melt, issuing a plurality of streams of molten glass from the melt, rapidly attenuating the streams of molten glass into fine flexible glass fibers, coating the individual glass fibers immediately after forming with a composition containing a curable or vulcanizable elastomeric material in an amount up to 5 percent by weight but more than 0.5 percent by weight, calculated on the dry solids basis, gathering the coated fibers into a glass fiber bundle, heating the fibers before or after bundle formation to advance the elastomeric component to at least a partially cured or vulcanized state, processing bundles of such coated glass fibers to the form desired for combination with the continuous phase elastomer, and impregnating the processed bundles of glass fibers with a rubber-based impregnating composition to provide a total loading of coating and impregnating composition of more than 10 percent but less than 18 percent by weight calculated on the dry solids basis.

12. The method as claimed in claim 11 in which the amount of coating applied to the glass fibers is within the range of 2–4 percent by weight solids.

13. In the method of producing glass fiber-reinforced elastomeric products comprising combining the elastomeric material forming the continuous phase in the elastomeric product in an uncured or unvulcanized state with glass fibers in bundle form loaded with more than 10 percent by weight but less than 18 percent by weight of elastomeric based material with with individual fibers coated with 0.5–5 percent by weight of an elastomeric material in at least a partially cured or vulcanized state, molding the combination of glass fiber bundles and continuous phase elastomer and advancing the elastomeric material to a set stage.

14. The method as claimed in claim 13 in which the glass fiber bundles are loaded with the elastomeric based material in an amount within the range of 10–18 percent by weight.

15. The method as claimed in claim 13 in which the molded elastomeric material and glass fiber product are advanced to a cured stage.

16. The method as claimed in claim 13 in which the molded elastomeric material and glass fiber product are advanced to a vulcanized stage.

17. A bundle formed of a multiplicity of glass fibers, an elastomeric based material distributed throughout the cross section of the glass fiber bundle with the concentration of elastomeric-based material being higher in the outer portions of the glass fiber bundle than in the central interior portion of the glass fiber bundle with the individual fibers coated with 0.5–5 percent by weight of an elastomeric material in at least a partially cured or vulcanized state and with the amount of loading of the elastomeric based materials in the glass fiber bundles being within the range of 10–24 percent by weight.

18. A glass fiber reinforcement for elastomeric materials comprising a bundle formed of a multiplicity of glass fibers in which the individual glass fibers of the bundle have a coating of elastomeric-based material in at least a partially cured or vulcanized state and in which the bundle of glass fibers is fully loaded with elastomeric-based material in an amount sufficient to interbound the bundle with the continuous phase elastomer to be reinforced while protecting the individual glass fibers in the bundle to prevent the fibers from breaking through during flexure and wherein the individual glass fibers in the bundle are capable of relative movement sufficient to contribute their proportionate share of reinforcement in the bundle.

* * * * *